Jan. 7, 1947. H. B. TAFT 2,414,072

TRACTOR IMPLEMENT ACTUATING MECHANISM

Filed April 13, 1944

INVENTOR.
Howard B. Taft,
BY Chas. J. Wilson
Atty.

Patented Jan. 7, 1947

2,414,072

UNITED STATES PATENT OFFICE 2,414,072

TRACTOR IMPLEMENT ACTUATING MECHANISM

Howard B. Taft, Chicago, Ill.

Application April 13, 1944, Serial No. 530,865

4 Claims. (Cl. 255—19)

This invention relates to actuating mechanism for implements designed as attachments to farm tractors. While the principles of my invention may be utilized in connection with the operation of various types of implements, I have here disclosed for illustrative purposes an element in the form of an earth auger adapted for the drilling or boring of fence post holes.

In my pending application Serial No. 507,545, filed October 25, 1943, I disclosed an earth auger mounted on a tractor and adapted to be raised by hydraulically actuated elevating mechanism. When in operation the weight of the auger and its associated parts was relied upon to cause the entry of the auger into the earth when revolved. Experience has demonstrated, however, that in certain types of soil, such as hardpan and the like, some force in addition to the force of gravity acting on the auger is necessary to cause penetration of the auger into the earth. My present invention, which constitutes an improvement upon the apparatus disclosed in my aforesaid application, is designed to utilize the hydraulic lifting apparatus of a standard tractor not only for the purpose of lifting or elevating the implement, as in my prior application, but also for the purpose of exerting a downward thrust upon such implement, whether an auger or some other type of earth working implement, whereby the same is caused to positively enter the soil.

The primary purpose, therefore, of my present invention is to provide an apparatus which can be shifted to utilize the power of the hydraulic lift of a tractor to either lift the tractor implement or force it downwardly, depending upon the position to which the control is shifted.

Another purpose of my invention is to provide a mechanism which will be an adjunct to the implement lifting system which constitutes standard equipment on many tractors.

Other objects and advantages of my invention will be appreciated as the same is better understood by reference to the following description when considered in connection with the accompanying drawing.

Referring to the drawing.

Figure 1:
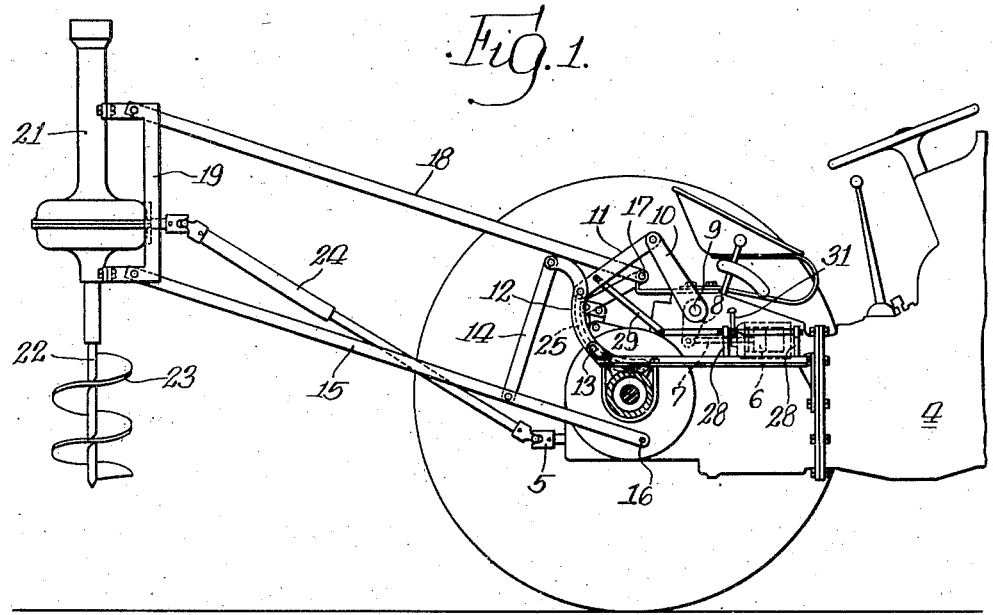
Fig. 1 is a fragmentary side elevation of a tractor equipped with my invention.

Referring now to the drawing more in detail, reference character 4 designates the rear transmission enclosing portion of a tractor which may be of any suitable type, although the drawing represents a Ford farm tractor.

Such tractor has a rearwardly extending power take-off 5 and as standard equipment is provided with an implement draft and lift system, including a hydraulic actuator 6 which in response to the influence of oil pressure directed thereto actuates through a link 7 a bell crank lever comprising an arm 8, a shaft 9 carried by the tractor housing and a pair of arms 10 fixed upon the ends of the shaft 9. Each of the arms 10 is pivotally connected by a link 11 with an operating lever 12 fulcrumed upon the tractor at 13.

The rear end of lever 12 is connected by a link 14 with lift lever 15 fulcrumed at 16 to the tractor. A fulcrum bolt 17 mounted upon the tractor carries the forward ends of the upper members 18.

As in my prior application above referred to, the fulcra 16 of the lower members 15 and the fulcra provided by the bolt 17 for the upper members 18 are located in the same vertical plane so as to insure the maintenance of the vertical position of the auger carried at the outer ends of these members.

The outer ends of members 15 and 18 are pivotally connected at points equidistant from their respective fulcra with an adaptor 19 which carries an auger shaft housing 21 in which the auger shaft 22 carrying the auger 23 is journaled. A beveled gear mounted upon the auger shaft within the enlarged portion of the housing is driven by a beveled pinion which, through the shaft 24 and suitable universal joints, is driven from the power take-off 5 to operate the auger.

The operating lever 12 to which the links 11 and 14 are connected is provided on one face with a channel-shaped track 25 (Fig. 3) in which a roller 26 mounted on the link 11 is adapted to travel. The track conforms to the curvature of the lever and extends substantially equal distances in both directions from the fulcrum 13. Suitable means for shifting the link 11 so as to dispose the roller 26 in one end or the other of the grooved track are provided. In the embodiment illustrated this means comprises a longitudinally adjustable bar 27 slidably mounted in supports 28 and connected by a link 29 with the link 11, as shown. When the bar 27, which is provided with a handle 31, is positioned as shown in Fig. 1, the link 11 is adjusted to dispose the roller 26 in the rear end of the grooved track 25. Adjustment of the bar 27 from the full line position of Fig. 1 to the full line position of Fig. 2 swings the link 11 to dispose the roller 26 in the forward end of the grooved track 25. During these adjusting movements the hydraulic actuator 6 is relieved of pressure so that the arm 10 may swing on its fulcrum to permit the adjusting movements of the link 11. It will be understood that the hydraulic actuator 6 applies force in one direction only, tending to swing the arm 10 always in a clockwise direction.

Assuming the parts to be in the position illustrated in Fig. 1, the action of the hydraulic actuator tending to swing the arm 10 in a clockwise direction holds the auger in elevated inoperative position. For this operation the link 11 is adjusted to bring the roller 26 into the rear end of the grooved track 25. Upon release of the pressure in the actuator the auger will swing downwardly under the influence of gravity until it rests upon the ground. Assuming that the soil is of such a character that the auger will not enter when rotated merely under the influence of gravity, the operating mechanism is then adjusted to force the auger into the ground upon rotation. To effect this result the bar 27 is shifted from the position shown in Fig. 1 to that shown in Fig. 2, thereby swinging the lower end of the link 11 forwardly from the rear end of the grooved track to the forward end thereof. Application of hydraulic pressure by the actuator 6 tending to swing the arm 10 in a clockwise direction will, through the link 11, exert an upward pull upon the forward end of lever 12, thereby forcing its rear end downwardly so that through the link 14 a downward pressure or thrust is exerted upon the lever 15 to cause the auger to enter the earth.

Figure 2:
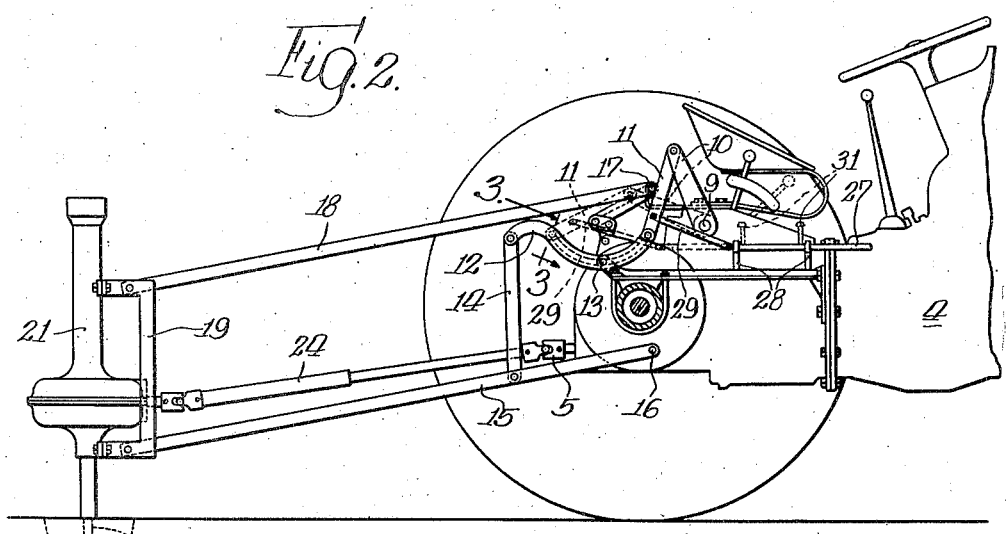
Fig. 2 is a similar view of the parts disposed in another position.
Figure 3:
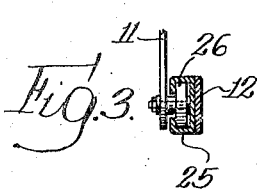
Fig. 3 is a fragmentary sectional view on the line 3—3 of Fig. 2.

When the hole has been bored or drilled to the desired depth, the bar 27 is shifted backwardly to position the roller 26 in the rear end of the grooved track 25, as shown in dotted lines in Fig. 2, whereupon pressure of the actuator will swing the arm 10 from the dotted line position of Fig. 2 into the full line position of Fig. 1, thereby lifting the auger vertically out of the hole and into elevated position.

It will be apparent, therefore, that I have provided an apparatus by which the standard implement lifting mechanism of a tractor may be utilized not only to lift the implement attached to the tractor, but also to positively lower it and insure its penetration into the earth. As previously stated, the auger here shown is merely an exemplification of a number of earth working tools or implements which may under certain conditions require the downward application of pressure to force them into the ground.

The structural details illustrated and described may be varied within considerable limits without departing from the scope of the invention as defined in the following claims.

I claim:

1. The combination with a tractor, of a hydraulically actuated arm, an implement operating lever fulcrumed between its ends on said tractor, a link pivoted at one end to said arm and provided at its other end with a roller, a curved track carried by said lever and extending across the fulcrum thereof and with which said roller is operatively engaged, and means for swinging said link to move said roller across the fulcrum of said lever whereby the operative effect of said lever under the influence of said arm is reversed.

2. The combination with a tractor having an implement carrying lever fulcrumed thereon, of an arm mounted for oscillatory movement about a fulcrum, an operating lever fulcrumed intermediate its ends on the tractor and connected at one end with said implement carrying lever, a link pivotally connected at one end with said arm and having a slidable connection at its other end with said operating lever, said connection being shiftable along said operating lever across the fulcrum thereof, and means for shifting said operating connection across the fulcrum of said lever to reverse the operative effect of the lever when actuated by said arm.

3. The combination with a tractor having an oscillatory arm and a single acting operator therefor, of an implement lever fulcrumed on the tractor, an operating lever fulcrumed intermediate its ends on the tractor and provided with a track extending across the fulcrum of said lever, a link connecting one end of said operating lever with said implement lever, a second link connecting said operating lever with said arm, said second link having a roller shiftable along said track of the operating lever from one side to the other of said fulcrum, and means for shifting the position of said roller connection whereby the operative effect of said lever under the influence of said arm may be reversed.

4. The combination with a tractor, of a hydraulically operated arm pivoted thereon for operative movement in one direction, an operating lever fulcrumed between its ends thereon, an implement carrying lever, a link connecting said implement carrying lever to one end of said operating lever, a link pivoted at one end to said arm and slidably connected at its other end with said operating lever so as to be movable across the fulcrum of said operating lever, and manually operable means for swinging said second link to dispose its connection with the operating lever at one side or the other of the fulcrum of said lever.

HOWARD B. TAFT.